United States Patent
Okamoto et al.

(10) Patent No.: US 9,760,091 B2
(45) Date of Patent: Sep. 12, 2017

(54) JET PROPULSION WATERCRAFT AND CONTROL METHOD THEREOF

(71) Applicant: YAMAHA HATSUDOKI KABUSHIKI KAISHA, Iwata-shi, Shizuoka (JP)

(72) Inventors: Yukitaka Okamoto, Shizuoka (JP); Wataru Ikeya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/882,494

(22) Filed: Oct. 14, 2015

(65) Prior Publication Data
US 2016/0266580 A1  Sep. 15, 2016

(30) Foreign Application Priority Data
Mar. 13, 2015 (JP) .................................. 2015-050925

(51) Int. Cl.
| | |
|---|---|
| G01C 21/36 | (2006.01) |
| G05D 1/00 | (2006.01) |
| B63H 21/21 | (2006.01) |
| G05D 1/02 | (2006.01) |
| B63B 39/03 | (2006.01) |

(Continued)

(52) U.S. Cl.
CPC .......... *G05D 1/0206* (2013.01); *B63B 39/03* (2013.01); *B63B 43/06* (2013.01); *B63H 25/46* (2013.01); *B63H 21/21* (2013.01); *B63H 21/22* (2013.01); *B63H 25/42* (2013.01); *F02D 31/001* (2013.01); *G01C 21/36* (2013.01)

(58) Field of Classification Search
None
See application file for complete search history.

(56) References Cited

U.S. PATENT DOCUMENTS 5,325,804 A * 7/1994 Schneider ............... B63B 1/107
114/125
7,143,363 B1 * 11/2006 Gaynor ................... B63J 99/00
340/461

(Continued)

FOREIGN PATENT DOCUMENTS

JP   2002-180861 A    6/2002
WO   WO 9808732 A1 *  3/1998  ............. B63B 1/042

*Primary Examiner* — Thomas G Black
*Assistant Examiner* — Demetra Smith-Stewart
(74) *Attorney, Agent, or Firm* — Keating and Bennett, LLP (57) ABSTRACT

A jet propulsion watercraft includes a vessel body, an engine, a jet propulsion unit, a weight information obtaining processor, an engine controller, and a target rotational speed determining processor. The engine is accommodated in the vessel body. The jet propulsion unit is driven by the engine and propels the vessel body. The weight information obtaining processor obtains weight information regarding a weight of the vessel body. The engine controller controls an engine rotational speed such that a vessel velocity reaches a predetermined set velocity. The target rotational speed determining processor determines a target engine rotational speed corresponding to the set velocity in accordance with the weight information. The engine controller controls the engine rotational speed such that the vessel velocity reaches the set velocity based on the target engine rotational speed determined in accordance with the weight information.

8 Claims, 10 Drawing Sheets

(51) Int. Cl.
  *B63H 25/46*  (2006.01)
  *B63B 43/06*  (2006.01)
  *B63H 21/22*  (2006.01)
  *F02D 31/00*  (2006.01)
  *B63H 25/42*  (2006.01)

(56) References Cited

U.S. PATENT DOCUMENTS

| | | | | |
|---|---|---|---|---|
| 7,177,734 | B2* | 2/2007 | Fossen | G05D 1/0875 |
| | | | | 701/21 |
| 7,416,660 | B2* | 8/2008 | van Leeuwen | C02F 1/78 |
| | | | | 114/125 |
| 7,565,876 | B2* | 7/2009 | Wilson | B63J 99/00 |
| | | | | 114/122 |
| 8,145,371 | B2* | 3/2012 | Rae | B63H 11/107 |
| | | | | 701/21 |
| 8,973,513 | B2* | 3/2015 | Morrison | B63B 13/00 |
| | | | | 114/125 |
| 9,068,855 | B1* | 6/2015 | Guglielmo | G01C 21/36 |
| 9,556,806 | B1* | 1/2017 | O'Brien | B63H 21/213 |
| 2001/0036777 | A1* | 11/2001 | Iida | B63H 21/22 |
| | | | | 440/84 |
| 2003/0060094 | A1* | 3/2003 | Motsenbocker | B63H 1/28 |
| | | | | 440/6 |
| 2008/0269968 | A1* | 10/2008 | Stewart | B63H 20/12 |
| | | | | 701/21 |
| 2008/0302738 | A1* | 12/2008 | Glessner | B63B 13/02 |
| | | | | 210/767 |
| 2010/0240266 | A1* | 9/2010 | Shibayama | B63H 21/213 |
| | | | | 440/1 |
| 2011/0041749 | A1* | 2/2011 | Nielsen | B63B 25/004 |
| | | | | 114/72 |
| 2012/0000713 | A1* | 1/2012 | Taboada | G01G 19/60 |
| | | | | 177/1 |
| 2013/0213293 | A1* | 8/2013 | Gasper | B63B 1/28 |
| | | | | 114/284 |
| 2013/0228115 | A1* | 9/2013 | Gasper | B63B 1/32 |
| | | | | 114/284 |
| 2014/0261135 | A1* | 9/2014 | Gasper | B63B 1/32 |
| | | | | 114/284 |
| 2015/0053127 | A1* | 2/2015 | Bertalan | B63B 39/03 |
| | | | | 114/125 |
| 2015/0239541 | A1* | 8/2015 | Anma | B63B 35/731 |
| | | | | 440/1 |
| 2016/0097393 | A1* | 4/2016 | Hartman | F04D 13/12 |
| | | | | 701/21 |

* cited by examiner

|                    | BALLAST WEIGHT LEVEL |     |     |     |     |
| ------------------ | --- | --- | --- | --- | --- |
| SET VELOCITY [km/h] | 1   | 2   | 3   | 4   | 5   |
| V1 | N11 | N12 | N13 | N14 | N15 |
| V2 | N21 | N22 | N23 | N24 | N25 |
| V3 | N31 | N32 | N33 | N34 | N35 |
| V4 | N41 | N42 | N43 | N44 | N45 |
| V5 | N51 | N52 | N53 | N54 | N55 |
| V6 | N61 | N62 | N63 | N64 | N65 |
| V7 | N71 | N72 | N73 | N74 | N75 |
| V8 | N81 | N82 | N83 | N84 | N85 |
| V9 | N91 | N92 | N93 | N94 | N95 |

JET PROPULSION WATERCRAFT AND CONTROL METHOD THEREOF

BACKGROUND OF THE INVENTION

1. Field of the Invention

The present invention relates to a jet propulsion watercraft and a method of controlling the same.

2. Description of the Related Art

A jet propulsion watercraft including a so-called cruise control function has been known. During the cruise control function, the vessel body of the jet propulsion watercraft is controlled such that the jet propulsion watercraft cruises at a predetermined vessel velocity set while steering the jet propulsion watercraft. For example, a small planing boat disclosed in Japan Laid-open Patent Application Publication No. 2002-180861 includes a cruise control switch that controls the engine thereof so as to cruise at a predetermined vessel velocity or at a predetermined engine rotational speed in response to an operation of the cruise control switch.

When the vessel velocity of the above-described small planing boat is lower than a set velocity at a point of time that the cruise control switch is operated, the small planing boat accelerates until the vessel velocity thereof reaches the set velocity. It is preferable to stably control the acceleration of the small planing boat.

However, the weight of the jet propulsion watercraft varies depending on situations, even though the vessel body of the jet propulsion watercraft is unchanged. For example, the weight of the jet propulsion watercraft varies depending on a variation in the ballast water stored in a ballast tank or a variation in the number or weight of the crew. In the above-described small planing boat, acceleration during cruise control inevitably varies in accordance with variations in the weight of the jet propulsion watercraft. Therefore, it is difficult to maintain stable acceleration during cruise control.

SUMMARY OF THE INVENTION

Preferred embodiments of the present invention provide a jet propulsion watercraft that maintains stable acceleration during cruise control.

A jet propulsion watercraft according to a preferred embodiment of the present invention includes a vessel body, an engine, a jet propulsion unit, a weight information obtaining processor, an engine controller, and a target rotational speed determining processor. The engine is accommodated in the vessel body. The jet propulsion unit is driven by the engine and propels the vessel body. The weight information obtaining processor obtains weight information regarding a weight of the vessel body. The engine controller controls an engine rotational speed such that a vessel velocity reaches a predetermined set velocity. The target rotational speed determining processor determines a target engine rotational speed corresponding to the set velocity in accordance with the weight information. The engine controller controls the engine rotational speed such that the vessel velocity reaches the set velocity based on the target engine rotational speed determined in accordance with the weight information.

A control method according to another preferred embodiment of the present invention is a method of controlling a jet propulsion watercraft. The jet propulsion watercraft includes a vessel body, an engine, and a jet propulsion unit. The engine is accommodated in the vessel body. The jet propulsion unit is driven by the engine and propels the vessel body. The control method according to a preferred embodiment preferably includes a first step, a second step, and a third step. In the first step, weight information regarding a weight of the vessel body is obtained. In the second step, a target engine rotational speed corresponding to a predetermined set velocity is determined in accordance with the weight information. In the third step, an engine rotational speed is controlled such that a vessel velocity reaches the set velocity based on the target engine rotational speed determined in accordance with the weight information.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
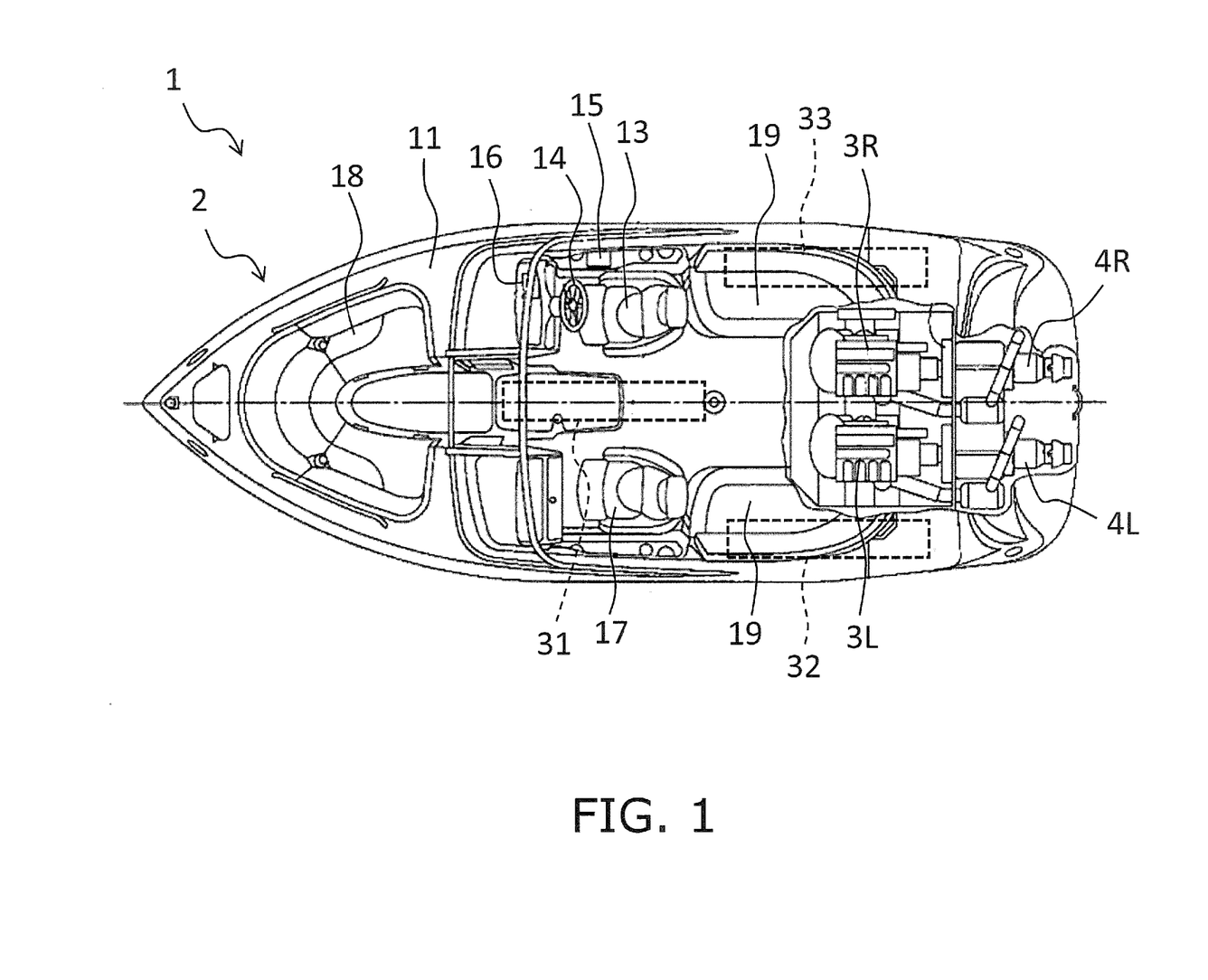
FIG. 1 is a plan view of a jet propulsion watercraft according to a preferred embodiment of the present invention.
Figure 2:
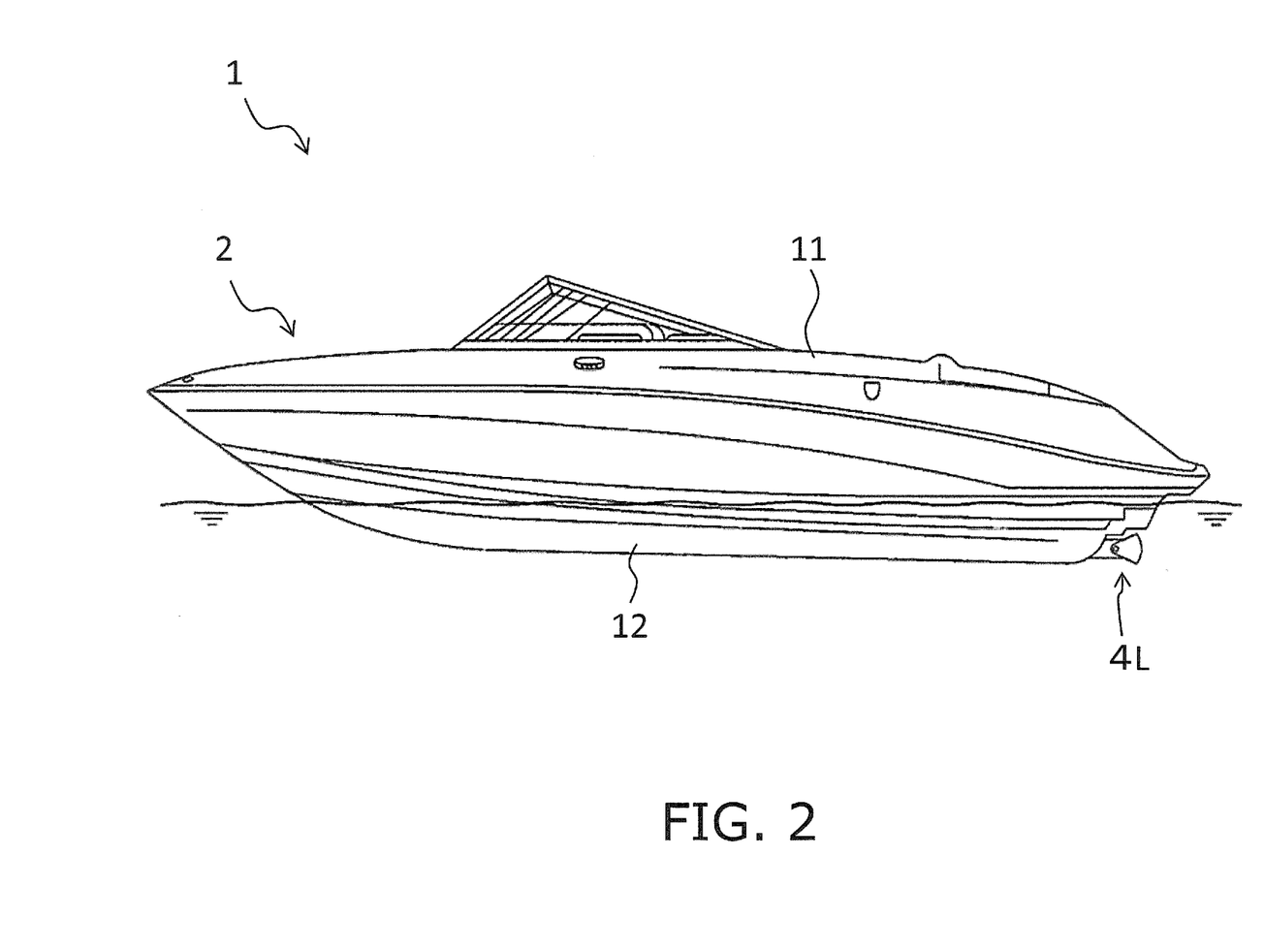
FIG. 2 is a side view of the jet propulsion watercraft.

A jet propulsion watercraft according to various preferred embodiments of the present invention will be hereinafter explained with reference to the attached drawings. FIG. 1 is a plan view of a jet propulsion watercraft 1 according to a preferred embodiment of the present invention. It should be noted that FIG. 1 shows a portion of an internal construction of a vessel body. FIG. 2 is a side view of the jet propulsion watercraft 1. In a preferred embodiment, the jet propulsion watercraft 1 is preferably a type of watercraft called a jet boat or a sport boat, for example.

The jet propulsion watercraft 1 includes a vessel body 2, engines 3L and 3R, and jet propulsion units 4L and 4R. The vessel body 2 includes a deck 11 and a hull 12. The hull 12 is disposed under the deck 11.

An operator seat 13, a steering wheel 14, and a remote control unit 15 are mounted to the deck 11. The steering wheel 14 is disposed in front of the operator seat 13. The steering wheel 14 steers the vessel body 2. The remote control unit 15 is disposed beside the operator seat 13. The remote control unit 15 regulates the outputs of the engines 3L and 3R and switches between forward movement and rearward movement.

A display 16 is mounted to the deck 11. The display 16 is disposed in front of the operator seat 13. The function of the display 16 will be explained below in detail.

A passenger seat 17 is mounted to the deck 11. The passenger seat 17 is disposed beside the operator seat 13. Additionally, a front seat 18 and a rear seat 19 are mounted to the deck 11. The front seat 18 is disposed forward of the operator seat 13. The rear seat 19 is disposed rearward of the operator seat 13.

The jet propulsion watercraft 1 according to a preferred embodiment includes, for example, the two engines 3L and 3R and the two jet propulsion units 4L and 4R, for example. When described in detail, the jet propulsion watercraft 1 includes the first engine 3L and the second engine 3R. The jet propulsion watercraft 1 includes the first jet propulsion unit 4L and the second jet propulsion unit 4R. It should be noted that the number of the engines 3L and 3R and the number of the jet propulsion units 4L and 4R are not respectively limited to two, and may be respectively one or more than two.

The first engine 3L and the second engine 3R are accommodated in the vessel body 2. An output shaft of the first engine 3L is connected to the first jet propulsion unit 4L. An output shaft of the second engine 3R is connected to the second jet propulsion unit 4R. The first jet propulsion unit 4L is driven by the first engine 3L. The second jet propulsion unit 4R is driven by the second engine 3R. The first jet propulsion unit 4L and the second jet propulsion unit 4R are preferably disposed side-by-side in the left and right direction.

Figure 3:
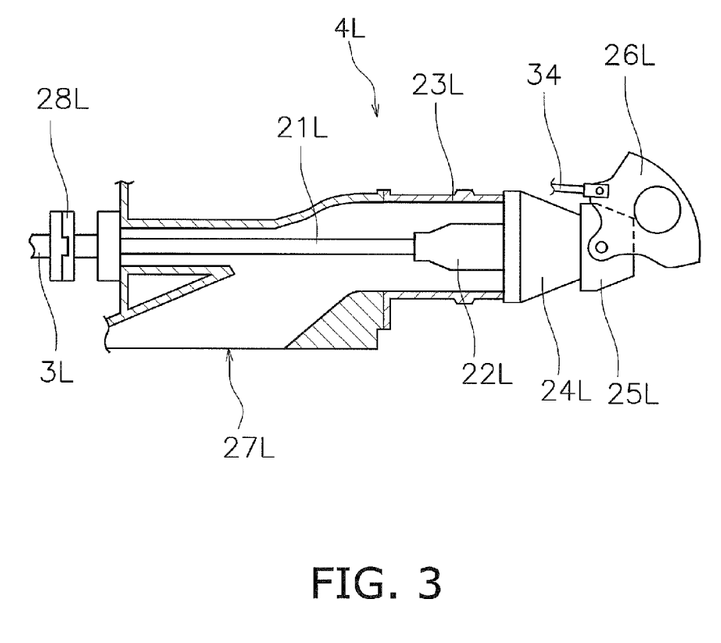
FIG. 3 is a side view of a construction of a first jet propulsion unit.

The first jet propulsion unit 4L sucks in water around the vessel body 2 and ejects the sucked-in water. FIG. 3 is a side view of a construction of the first jet propulsion unit 4L. It should be noted that in FIG. 3, the first jet propulsion unit 4L is partially shown in cross-section.

As shown in FIG. 3, the first jet propulsion unit 4L includes a first impeller shaft 21L, a first impeller 22L, a first impeller housing 23L, a first nozzle 24L, a first deflector 25L, and a first reverse bucket 26L. The first impeller shaft 21L extends in the back-and-forth direction. The front portion of the first impeller shaft 21L is connected to the output shaft of the engine 3L through a coupling 28L. The rear portion of the first impeller shaft 21L is disposed inside the first impeller housing 23L. The first impeller housing 23L is disposed behind a water suction portion 27L. The first nozzle 24L is disposed behind the first impeller housing 23L.

The first impeller 22L is attached to the rear portion of the first impeller shaft 21L. The first impeller 22L is disposed inside the first impeller housing 23L. The first impeller 22L is rotated together with the first impeller shaft 21L and sucks in water through the water suction portion 27L. The first impeller 22L backwardly ejects the sucked-in water through the first nozzle 24L.

The first deflector 25L is disposed behind the first nozzle 24L. The first reverse bucket 26L is disposed behind the first deflector 25L. The first deflector 25L deflects the direction of water to be ejected through the first nozzle 24L in the right-and-left direction. Accordingly, the moving direction of the jet propulsion watercraft 1 is changed right and left.

The first reverse bucket 26L is mounted so as to be switchable between a forward moving position and a rearward moving position. When the first reverse bucket 26L is set in the forward moving position, water from the first nozzle 24L and the first deflector 25L is ejected rearward. Accordingly, the jet propulsion watercraft 1 moves forward. When the first reverse bucket 26L is set in the rearward moving position, the direction of water ejected through the first nozzle 24L and the first deflector 25L is deflected in the forward direction. Accordingly, the jet propulsion watercraft 1 moves rearward.

The construction of the second jet propulsion unit 4R is preferably similar to that of the first jet propulsion unit 4L. Hence, the detailed explanation thereof will not be hereinafter described.

As shown in FIG. 1, the jet propulsion watercraft 1 includes ballast tanks 31, 32, and 33. The ballast tanks 31, 32, and 33 are accommodated in the vessel body 2. When described in detail, the jet propulsion watercraft 1 includes the first ballast tank 31, the second ballast tank 32, and the third ballast tank 33. The first ballast tank 31 is preferably disposed in the middle of the jet propulsion watercraft 1 in the width direction of the jet propulsion watercraft 1. The second ballast tank 32 and the third ballast tank 33 are preferably disposed in a bilaterally symmetrical manner. It should be noted that the number of the ballast tanks is not limited to three, and may be less than or more than three.

Figure 4:
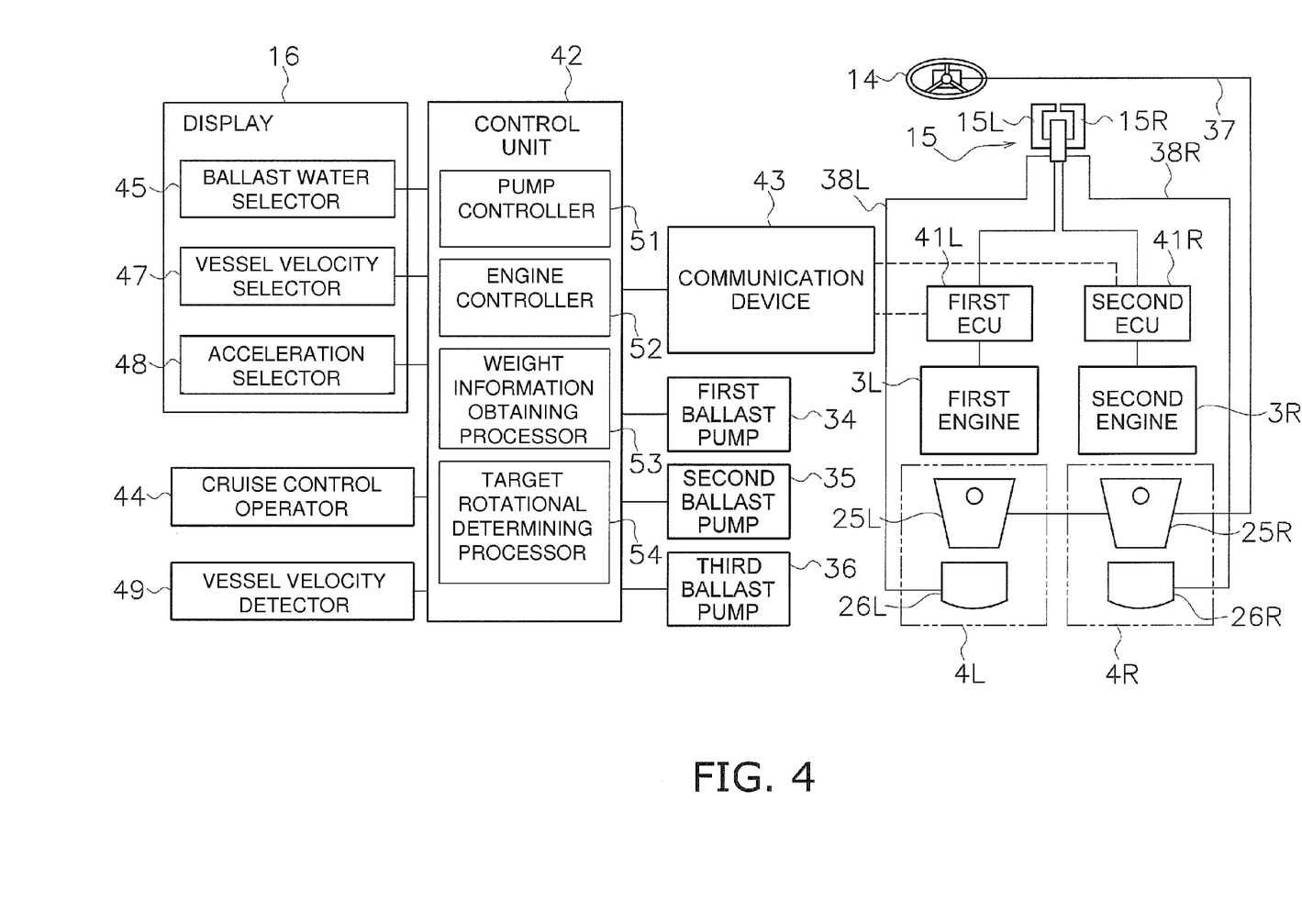
FIG. 4 is schematic diagram of a vessel steering mechanism and a control system in the jet propulsion watercraft.

Next, a vessel steering mechanism and a control system of the jet propulsion watercraft 1 will be explained. FIG. 4 is a schematic diagram showing the vessel steering mechanism and the control system of the jet propulsion watercraft 1. As shown in FIG. 4, the steering wheel 14 is connected to the first deflector 25L of the first jet propulsion unit 4L and a second deflector 25R of the second jet propulsion unit 4R through a steering cable 37. Rotation of the steering wheel 14 is transmitted to the first deflector 25L and the second deflector 25R through the steering cable 37. Therefore, the first deflector 25L and the second deflector 25R are turned right and left in conjunction with the rotation of the steering wheel 14. Accordingly, the moving direction of the jet propulsion watercraft 1 is changed right and left.

It should be noted that the first deflector 25L and the second deflector 25R may be turned right and left by actuators (e.g., electric motors) in conjunction with the rotation of the steering wheel 14.

The jet propulsion watercraft 1 includes a first ECU (Engine Control Unit) 41L and a second ECU 41R. The first ECU 41L controls the first engine 3L. The second ECU 41R controls the second engine 3R. The remote control unit 15 is connected to the first ECU 41L and the second ECU 41R via wire or wireless communication. The remote control unit 15 includes a first acceleration operating member 15L and a second acceleration operating member 15R. The first acceleration operating member 15L and the second acceleration operating member 15R are, for instance, lever-shaped members.

The remote control unit 15 transmits a signal indicating the operating amount of the first acceleration operating member 15L to the first ECU 41L. The remote control unit 15 transmits a signal indicating the operating amount of the second acceleration operating member 15R to the second ECU 41R. The first ECU 41L controls the rotational speed of the first engine 3L in accordance with the operating amount of the first acceleration operating member 15L. The second ECU 41R controls the rotational speed of the second engine 3R in accordance with the operating amount of the second acceleration operating member 15R.

The first acceleration operating member 15L is connected to the first reverse bucket 26L through a first bucket cable 38L. An operation of the first acceleration operating member 15L is transmitted to the first reverse bucket 26L through the first bucket cable 38L. Thus, the position of the first reverse bucket 26L is switched between the forward moving position and the rearward moving position.

The second acceleration operating member 15R is connected to a second reverse bucket 26R of the second jet propulsion unit 4R through a second bucket cable 38R. An operation of the second acceleration operating member 15R is transmitted to the second reverse bucket 26R through the second bucket cable 38R. Thus, the position of the second reverse bucket 26R is switched between the forward moving position and the rearward moving position. As described above, the moving direction of the jet propulsion watercraft 1 is switched between the forward and rearward directions in response to the operations of the first acceleration operating member 15L and the second acceleration operating member 15R.

It should be noted that the positions of the first reverse bucket 26L and the second reverse bucket 26R may be switched between the forward and rearward moving positions by actuators such as electric motors in response to the operations of the first acceleration operating member 15L and the second acceleration operating member 15R.

The jet propulsion watercraft 1 includes a control unit 42. The control unit 42 includes an arithmetic logic unit such as a CPU and storage devices such as a RAM and a ROM, and is programmed to control the jet propulsion watercraft 1. The jet propulsion watercraft 1 includes a communication device 43. The control unit 42 is connected to the first ECU 41L and the second ECU 41R through the communication device 43 so as to perform data communication therewith.

The jet propulsion watercraft 1 includes a cruise control operator 44. The cruise control operator 44 is operated to switch a cruise control function between an activated state (ON) and a deactivated state (OFF). The cruise control operator 44 is, for instance, a cruise control switch. It should be noted that the cruise control operator 44 may be other than switch. For example, the cruise control operator 44 may be included or embedded in the display 16 of a touch panel type to be described below. The cruise control function will be explained below in detail.

The display 16 displays information of the jet propulsion watercraft 1. The information of the jet propulsion watercraft 1 contains, for instance, the vessel velocity, the engine rotational speed, the fuel remaining amount and so forth. The display 16 is touch operable and performs a variety of operations of the jet propulsion watercraft 1.

Figure 5:
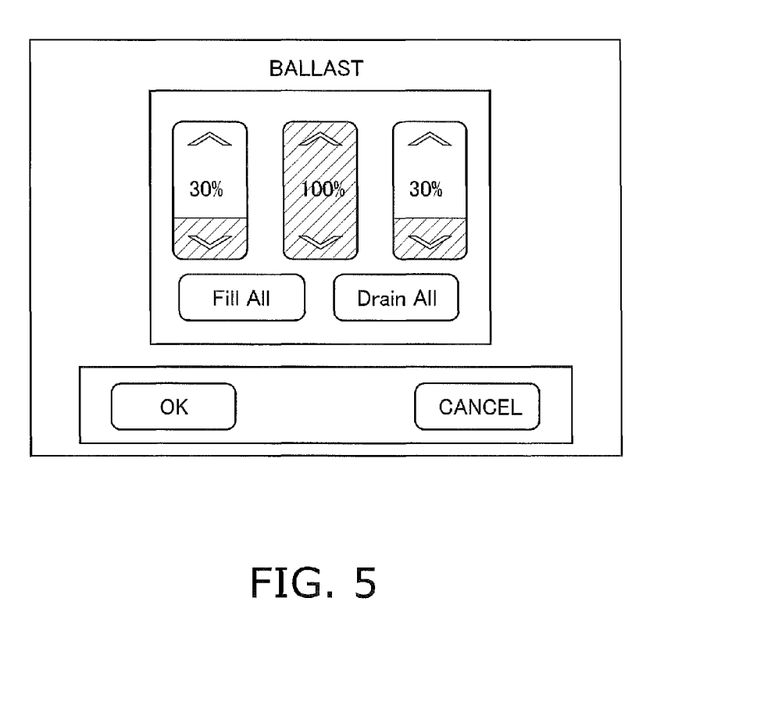
FIG. 5 is a diagram showing a screen that sets the ballast water.

The display 16 includes a ballast water selector 45. The ballast water selector 45 sets the amount of ballast water within the ballast tanks 31, 32, and 33. FIG. 5 shows a screen to set the ballast water. The ballast water selector 45 sets the amount of ballast water stored in each of the first, second, and third ballast tanks 31, 32, and 33. For example, the amount of ballast water to be stored in each of the first, second, and third ballast tanks 31, 32, and 33 is set to be in a range of 0 to 100% by touching an arrow icon displayed on the screen to set the ballast water.

The jet propulsion watercraft 1 includes a first ballast pump 34, a second ballast pump 35, and a third ballast pump 36. The first ballast pump 34 draws the ballast water into the first ballast tank 31. The second ballast pump 35 draws the ballast water into the second ballast tank 32. The third ballast pump 36 draws the ballast water into the third ballast tank 33.

The control unit 42 is programmed or configured to provide or implement a pump controller 51. The pump controller 51 controls the first to third ballast pumps 34 to 36 such that the amount of ballast water stored in each of the first to third ballast tanks 31 to 33 becomes the amount of ballast water set by the ballast water selector 45.

Next, the cruise control function will be explained. The display 16 includes a vessel velocity selector 47 and an acceleration selector 48. The vessel velocity selector 47 sets a set velocity during the cruise control. The display 16 displays a screen to set the set velocity. When the cruise control function is activated, the vessel velocity is accelerated or decelerated so as to reach the set velocity, and is then kept constant at the set velocity.

The jet propulsion watercraft 1 includes a vessel velocity detector 49. The vessel velocity detector 49 detects the vessel velocity of the jet propulsion watercraft 1. The control unit 42 is programmed or configured to provide or implement an engine controller 52. When the cruise control function is activated, the engine controller 52 transmits command signals to the first ECU 41L and the second ECU 41R such that the vessel velocity is kept constant at the set velocity.

The engine controller 52 controls the rotational speeds of the first engine 3L and the second engine 3R by feedback control such that the vessel velocity detected by the vessel velocity detector 49 is matched with the set velocity set by the vessel velocity selector 47. It should be noted that the engine controller 52 controls the engine rotational speed within a range of predetermined upper and lower limits based on a target engine rotational speed corresponding to the set velocity.

The acceleration selector 48 sets a predetermined acceleration at which the vessel velocity is accelerated to reach the set velocity when the cruise control function is activated. The display 16 displays a screen to set the predetermined acceleration. The acceleration selector 48 is able to select any one of a plurality of modes having different acceleration settings. When described in detail, the acceleration selector 48 is able to select, for example, a beginner mode, an intermediate mode, and a senior mode.

Figure 6:
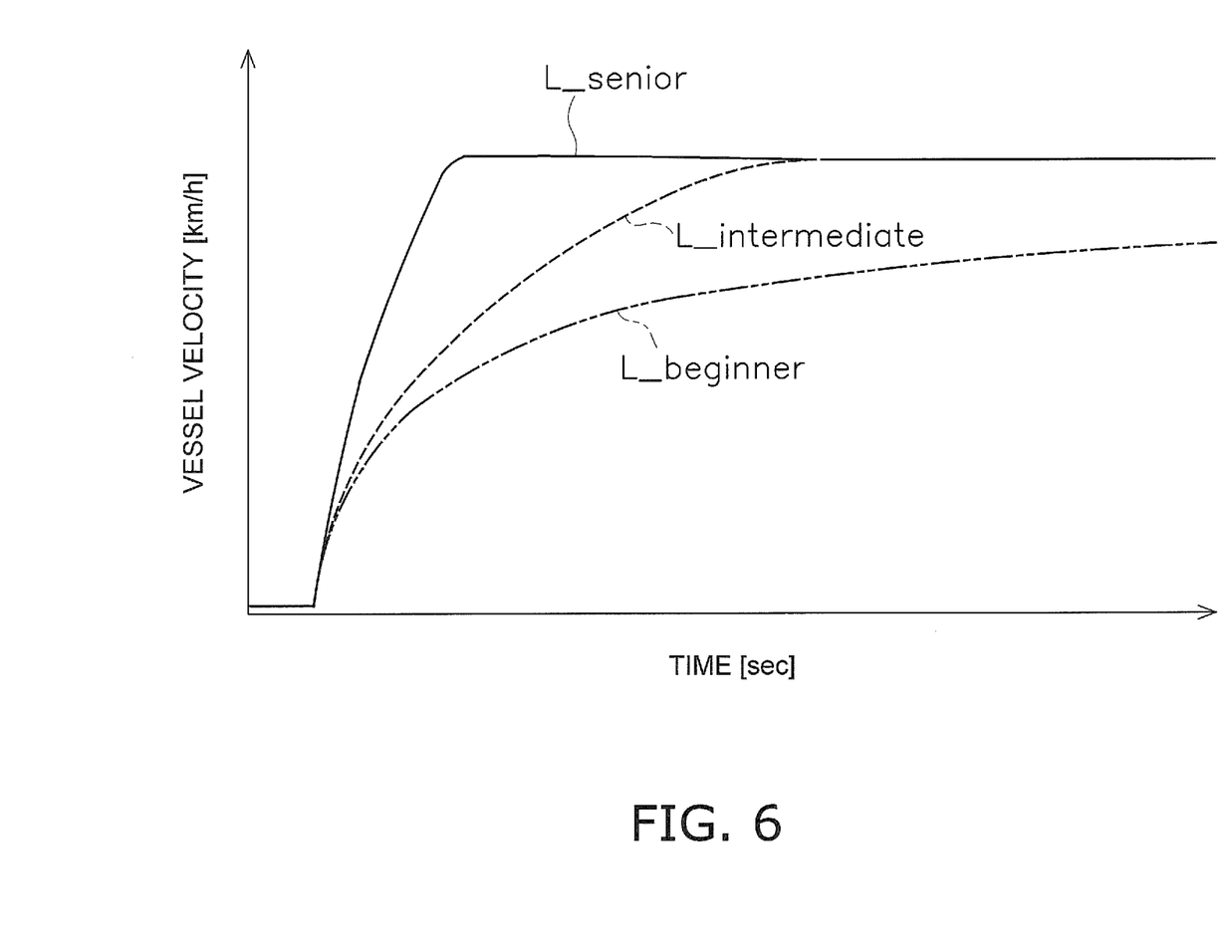
FIG. 6 is a chart showing variations in vessel velocity in respective modes until the vessel velocity reaches a set velocity.

FIG. 6 shows variations in vessel velocity until the vessel velocity reaches the set velocity in the respective modes. In FIG. 6, "L_beginner" indicates variations in vessel velocity in the beginner mode. "L_senior" indicates variations in vessel velocity in the senior mode. "L_intermediate" indicates variations in vessel velocity in the intermediate mode.

As shown in FIG. 6, the acceleration in the senior mode is higher than that in the beginner mode. The acceleration in the intermediate mode is higher than that in the beginner mode and is lower than that in the senior mode.

It should be noted that the vessel velocity selector 47 may be a member other than the display 16. For example, the vessel velocity selector 47 may be mounted to the above-described cruise control switch. The acceleration selector 48 may be a device other than the display 16. For example, a switch to set the acceleration may be provided as the acceleration selector 48.

The jet propulsion watercraft 1 controls the cruise control function in accordance with the weight of the vessel body 2. As shown in FIG. 4, the control unit 42 is programmed or configured to provide or implement a weight information obtaining processor 53 and a target rotational speed determining processor 54. The weight information obtaining processor 53 obtains weight information related to the weight of the vessel body 2. When described in detail, the weight information obtaining processor 53 obtains the weight information based on the weights of the ballast tanks 31, 32, and 33. The target rotational speed determining processor 54 determines the above-described target engine rotational speed corresponding to the set velocity in accordance with the weight information.

Figure 7:
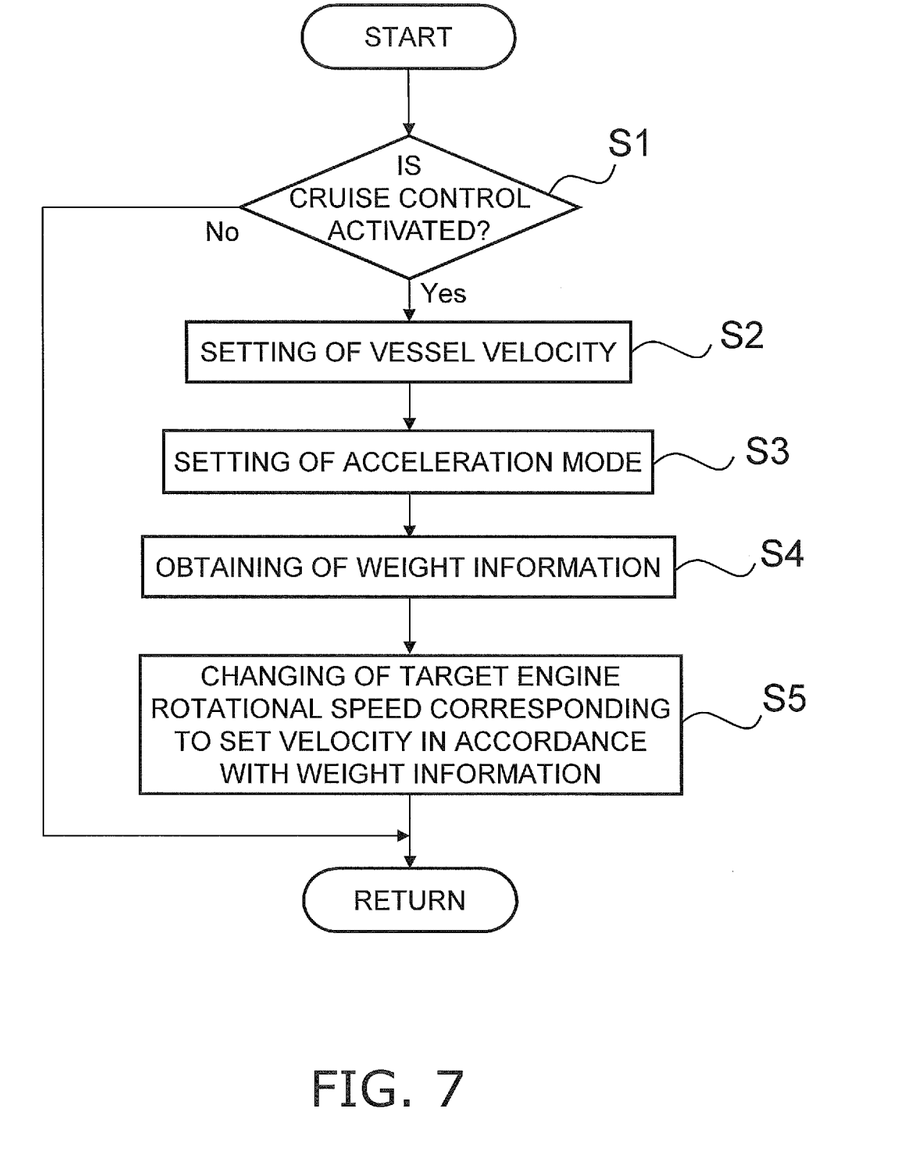
FIG. 7 is a flowchart showing a series of processes regarding cruise control.

Processes related to the cruise control function, which is executed by the control unit 42, will be hereinafter explained in detail. FIG. 7 is a flowchart showing the processes related to the cruise control function.

In Step S1, it is determined whether or not the cruise control function is activated. It is determined whether or not the cruise control function is activated based on an operation of the cruise control operator 44. When the cruise control function is activated, the process proceeds to Step S2.

In Step S2, the vessel velocity is set. The velocity selected by the vessel velocity selector 47 is set as the set velocity.

In Step S3, the acceleration mode is set. Any one of the senior mode, the intermediate mode, and the beginner mode, selected by the acceleration selector 48, is set as the acceleration mode.

In Step S4, the weight information obtaining processor 53 obtains the weight information. The weight information is determined based on the amount of ballast water set by the ballast water selector 45. When described in detail, the weight information includes a ballast weight level. The ballast weight level is divided into a plurality of levels. In the present preferred embodiment, the ballast weight level is divided into first to fifth levels. The first level is the lightest level and the fifth level is the heaviest level. Based on the amount of ballast water set by the ballast water selector 45, the weight information obtaining processor 53 determines in which of the first to fifth levels the ballast weight level falls. When described in detail, a level in which the average of the amounts of water in the first to third ballast tanks 31 to 33 falls is determined as the ballast weight level.

Figure 8:
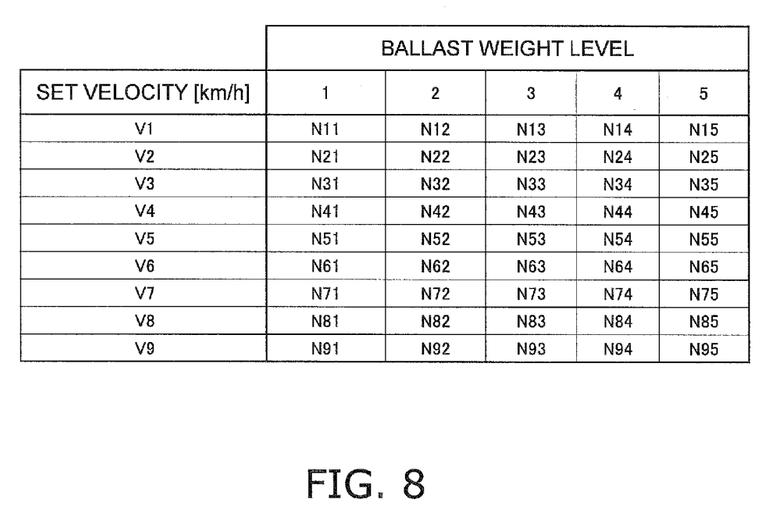
FIG. 8 is a diagram showing target engine rotational speed information.

In Step S5, the target rotational speed determining processor 54 changes the target engine rotational speed corresponding to the set velocity in accordance with the weight information. The target rotational speed determining processor 54 determines the target engine rotational speed corresponding to the set velocity based on the target engine rotational speed information. FIG. 8 is a diagram showing examples of the target engine rotational speed information. The target engine rotational speed information defines a relationship of the target engine rotational speed with respect to the weight information and the set velocity. When described in detail, the target engine rotational speed information defines a relationship of the target engine rotational speed with respect to the ballast weight level and the set velocity.

In FIG. 8, V1 to V9 indicate numeric values of the set velocity. V1 is the smallest value and V9 is the largest value. N11 to N95 indicate numeric values of the target engine rotational speed. Where the ballast weight level is constant, the target engine rotational speed increases with an increase in the set velocity. For example, a relationship "N11<N21< . . . <N81<N91" is established. On the other hand, where the set velocity is constant, the target engine rotational speed increases with an increase in the ballast weight level. For example, a relationship "N11<N12<N13<N14<N15" is established.

In the present preferred embodiment, the target engine rotational speed information is a table, and numeric values not contained in FIG. 8 are calculated by linear interpolation. It should be noted that the target engine rotational speed information is not limited to a table, and may use another form of information such as a map or a formula.

In the jet propulsion watercraft 1 according to the preferred embodiments explained above, the engine rotational speed is controlled based on the set velocity and the weight information such that the vessel velocity reaches the set velocity at a predetermined acceleration when the cruise control function is activated. Therefore, even when the weight of the jet propulsion watercraft 1 varies, the engine rotational speed is controlled such that the vessel velocity reaches the set velocity at the predetermined acceleration in accordance with variations in weight.

Figure 9:
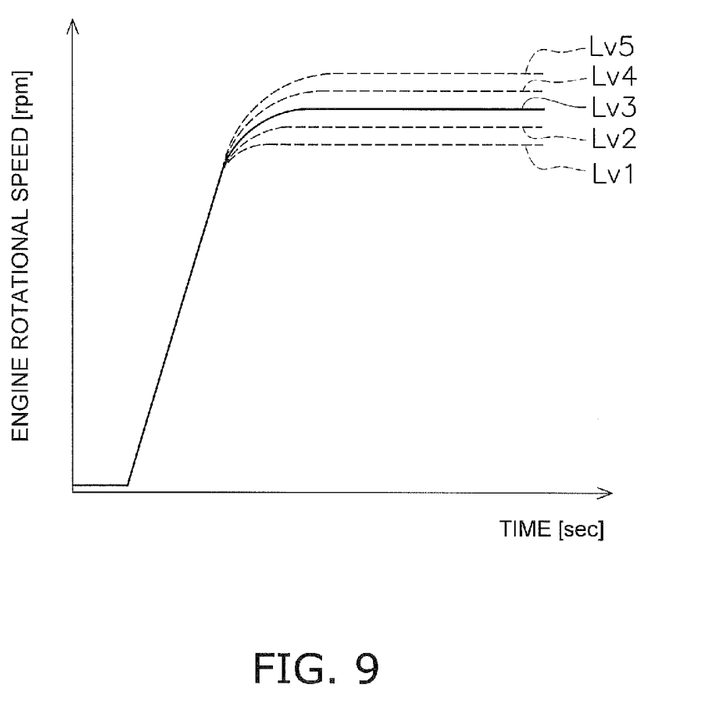
FIG. 9 is a chart showing variations in acceleration during starting of the cruise control.

For example, FIG. 9 is a chart showing variations in engine rotational speed when starting the cruise control and the weight of the jet propulsion watercraft 1 varies. It should be noted that the senior mode is assumed to be set as the acceleration mode. In FIG. 9, Lv1 to Lv5 respectively indicate variations in engine rotational speed where the ballast weight levels 1 to 5 are respectively set. As shown in FIG. 9, the target engine rotational speed is changed in accordance with the ballast weight level. When described in detail, the target engine rotational speed is changed so as to increase with an increase in the ballast weight level. Likewise, even in the intermediate and beginner modes, the target engine rotational speed is changed in accordance with the ballast weight levels. Accordingly, even when the weight of the jet propulsion watercraft 1 varies, acceleration performance is kept stable during cruise control.

Preferred embodiments of the present invention have been described above. However, the present invention is not limited to the above-described preferred embodiments, and a variety of changes can be made without departing from the scope of the present invention.

In the above-described preferred embodiments, the weight information is preferably the ballast weight level. However, the weight information may be the weights of the ballast tanks 31, 32, and 33. The weight information obtaining processor 53 may determine the weights of the ballast tanks 31, 32, and 33 based on the discharge displacements and the driving times of the ballast pumps. Alternatively, sensors may be provided to detect the weights of the ballast tanks 31, 32, and 33, and the weights of the ballast tanks 31, 32 and 33 may be determined based on the values detected by the sensors.

The weight information is not limited to the weights of the ballast tanks 31, 32, and 33, and may be arbitrarily set as long as it relates to the weight of the vessel body 2. For example, the weight information may be the number of the crew or the weight of the crew. Alternatively, the weight information may be a combination of the weights of the ballast tanks 31, 32, and 33 and either the number of the crew or the weight of the crew.

The acceleration selector 48 is only required to be able to select at least either of the beginner mode and the senior mode. Put differently, the intermediate mode may not be provided. Alternatively, the acceleration selector 48 may be able to select one of four or more acceleration modes. Yet alternatively, the acceleration selector 48 may not be provided.

A target variation amount of the engine rotational speed per unit time until the vessel velocity reaches the set velocity may be determined in accordance with the weight information. The target engine rotational speed and the target variation amount of the engine rotational speed may be changed so as to increase with an increase in the ballast weight level. Likewise, even in the intermediate and beginner modes, the target engine rotational speed and the target variation amount of the engine rotational speed may be changed in accordance with the ballast weight level.

Figure 10:
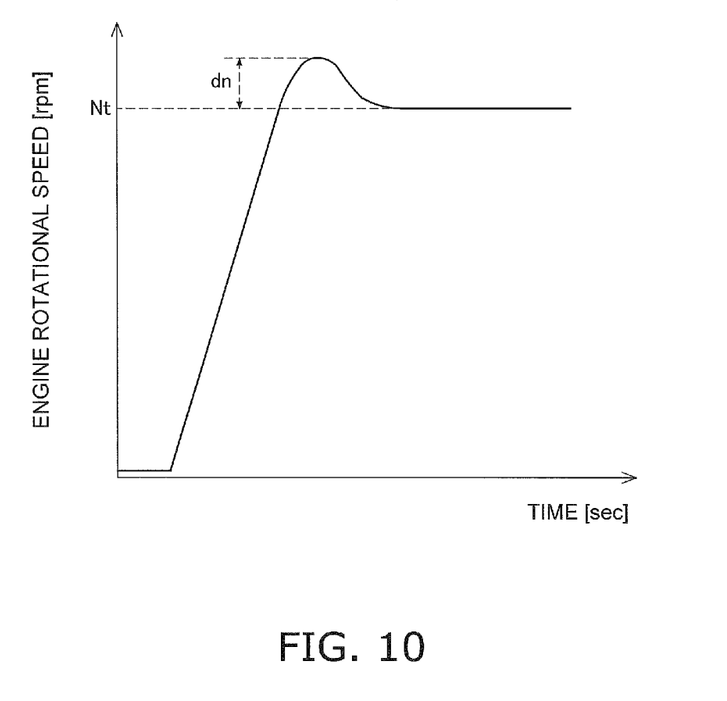
FIG. 10 is a chart showing an increase amount correction value.

An increase amount correction value of the target engine rotational speed may be determined based on the weight information. FIG. 10 shows the definition of the increase amount correction value. FIG. 10 shows variations in engine rotational speed when the cruise control function is activated. As shown in FIG. 10, the engine controller 52 controls the engine rotational speed such that the engine rotational speed is increased in and after activation of the cruise control function, exceeds a target engine rotational speed Nt by an increase amount correction value dn, and is then (after the exceeds) kept at a target engine rotational speed Nt. Thus, with addition of the increase amount correction value dn to the target engine rotational speed Nt, the vessel velocity is quickly increased when starting the cruise control. Alternatively, the target engine rotational speed and the increase amount correction value of the engine rotational speed may be changed so as to increase with an increase in the ballast weight level. Likewise, even in the intermediate and beginner modes, the target engine rotational speed and the increase amount correction value of the engine rotational speed may be changed in accordance with the ballast weight level.

The jet propulsion watercraft 1 is not limited to a sport boat and may be any other type of jet propulsion watercraft such as a PWC (Personal Water Craft).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A jet propulsion watercraft comprising:
   a vessel body;
   an engine accommodated in the vessel body;
   a jet propulsion unit that is driven by the engine and propels the vessel body;
   a weight information obtaining processor that obtains weight information regarding a weight of the vessel body;
   an engine controller that controls an engine rotational speed such that a vessel velocity reaches a predetermined set velocity;
   a cruise control operator that switches a cruise control function between an activated state and a deactivated state;
   an acceleration selector that selects any one of a plurality of acceleration modes having different acceleration settings, and that sets a predetermined acceleration at which the vessel velocity is accelerated to reach the predetermined set velocity based on a selected acceleration mode when the cruise control function is activated; and
   a target rotational speed determining processor that determines a target engine rotational speed corresponding to the predetermined set velocity in accordance with the weight information; wherein
   the engine controller controls the engine rotational speed based on the predetermined set velocity and the weight information such that the vessel velocity reaches the predetermined set velocity at the predetermined acceleration when the cruise control function is activated.

2. The jet propulsion watercraft according to claim 1, further comprising:
   a ballast tank accommodated in the vessel body; wherein
   the weight information obtaining processor obtains the weight information based on a weight of the ballast tank.

3. The jet propulsion watercraft according to claim 2, further comprising:
   a pump that draws ballast water into the ballast tank; wherein
   the weight information obtaining processor determines the weight of the ballast tank based on a driving time of the pump.

4. The jet propulsion watercraft according to claim 2, further comprising:
   a pump that draws ballast water into the ballast tank; and
   a ballast water selector that sets an amount of the ballast water in the ballast tank; wherein
   the weight information obtaining processor determines the weight of the ballast tank based on the set amount of the ballast water.

5. The jet propulsion watercraft according to claim 1, further comprising:
   a display that displays a screen to set the predetermined set velocity; wherein
   the display transmits the predetermined set velocity to the engine controller.

6. The jet propulsion watercraft according to claim 5, wherein the display is a touch operable display.

7. The jet propulsion watercraft according to claim 1, further comprising:
   a steering wheel to steer the vessel body.

8. A method of controlling a jet propulsion watercraft, the jet propulsion watercraft including a vessel body, an engine accommodated in the vessel body, and a jet propulsion unit that is driven by the engine and propels the vessel body, the method comprising the steps of:
   activating a cruise control function and setting a vessel velocity to a predetermined set velocity;
   setting a predetermined acceleration, from among a plurality of acceleration modes having different acceleration settings, at which the vessel velocity is accelerated to reach the predetermined set velocity;
   obtaining weight information regarding a weight of the vessel body;
   determining a target engine rotational speed corresponding to the predetermined set velocity in accordance with the weight information; and
   controlling an engine rotational speed based on the predetermined vessel velocity and the weight information such that the vessel velocity reaches the predetermined set velocity at the predetermined acceleration.

* * * * *